US010807808B1

(12) United States Patent
Rodgers et al.

(10) Patent No.: US 10,807,808 B1
(45) Date of Patent: Oct. 20, 2020

(54) SYSTEMS AND METHODS FOR AUTOMATED ITEM SEPARATION AND PRESENTATION

(71) Applicant: Amazon Technologies, Inc., Seattle, WA (US)

(72) Inventors: Tyler Rodgers, Puyallup, WA (US); Xujie Wang, Edgewood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/391,030

(22) Filed: Apr. 22, 2019

(51) Int. Cl.
| | |
|---|---|
| B65G 47/68 | (2006.01) |
| B65G 43/08 | (2006.01) |
| B65G 47/14 | (2006.01) |
| B65G 47/49 | (2006.01) |
| B25J 9/16 | (2006.01) |
| B25J 9/00 | (2006.01) |
| B65G 47/30 | (2006.01) |

(52) U.S. Cl.
CPC ............ B65G 47/68 (2013.01); B25J 9/0093 (2013.01); B25J 9/1697 (2013.01); B65G 43/08 (2013.01); B65G 47/1492 (2013.01); B65G 47/30 (2013.01); B65G 47/49 (2013.01); *B65G 2203/025* (2013.01); *B65G 2203/041* (2013.01); *B65G 2203/044* (2013.01)

(58) Field of Classification Search
CPC ........ B65G 47/30; B65G 47/31; B65G 47/32; B65G 47/68; B65G 47/1492
See application file for complete search history.

(56) References Cited

U.S. PATENT DOCUMENTS

| | | | | |
|---|---|---|---|---|
| 5,092,451 | A * | 3/1992 | Jones ..................... | B65G 43/08 198/444 |
| 5,314,055 | A * | 5/1994 | Gordon .................. | B25J 9/1697 198/395 |
| 5,687,831 | A * | 11/1997 | Carlisle .................. | A61F 11/12 198/395 |
| 5,950,800 | A * | 9/1999 | Terrell ............... | B65G 47/1492 198/448 |
| 6,491,154 | B2 * | 12/2002 | Ydoate .................. | B65G 47/31 198/444 |
| 10,315,859 | B1 * | 6/2019 | Zhao ...................... | B65G 47/31 |
| 2001/0013461 | A1 * | 8/2001 | Boucherie .............. | B65G 47/31 198/459.8 |
| 2017/0362036 | A1 * | 12/2017 | Hartmann ............ | G05B 19/418 |

\* cited by examiner

*Primary Examiner* — William R Harp
(74) *Attorney, Agent, or Firm* — Athorus, PLLC

(57) ABSTRACT

Systems and methods to separate and present items for picking and movement to various downstream systems may include an item separation system, a vision system, and an item picking system controlled or instructed by a control system. The control system may instruct an item separation system comprising a plurality of conveyors at various positions, orientations, or heights to separate and present items at a picking area. The vision system may capture imaging data of items at the picking area. The control system may identify items or pickable surfaces. The control system may further instruct an item picking system to pick and move items from the picking area to various downstream systems and/or may instruct the item separation system to change aspects of movement of items to further separate and present items at the picking area.

19 Claims, 6 Drawing Sheets

SYSTEMS AND METHODS FOR AUTOMATED ITEM SEPARATION AND PRESENTATION

BACKGROUND

Many companies may store, package, and ship items and/or groups of items from material handling facilities. For example, many companies may store items in a material handling facility and ship items to various destinations (e.g., customers, stores) from the material handling facility. Receipt of items in the material handling facility, storage of items within the material handling facility, shipping of items from the material handling facility, and the overall flow or movement of items within the material handling facility (e.g., from receive to storage to shipping) often incurs significant cost and time. Accordingly, there is a need for automated systems and methods to facilitate receive, sortation, storage, shipping, and other processes within a material handling facility, thereby improving the efficiency of such processes.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
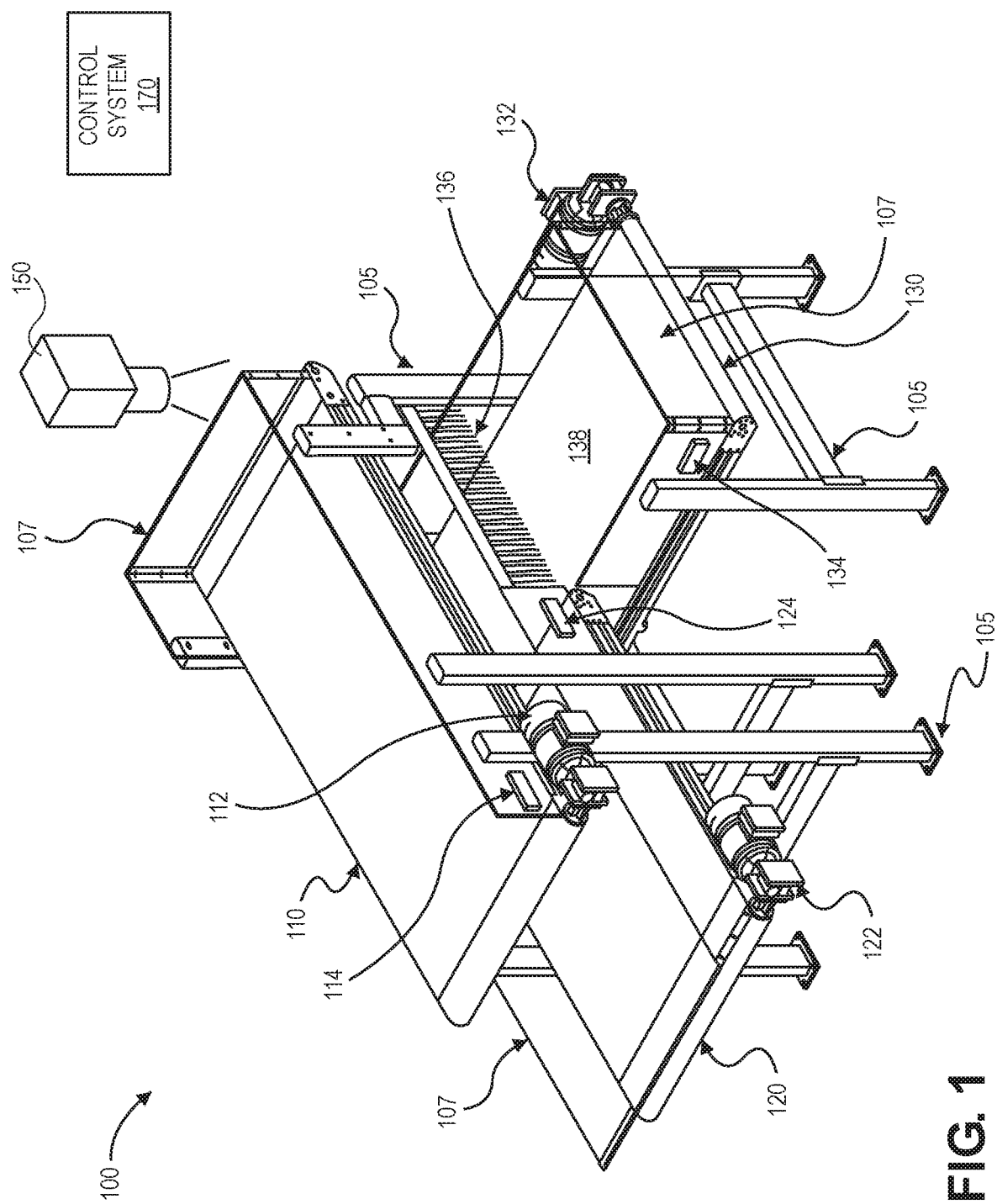
FIG. 1 is a partial schematic diagram of an example item separation and picking system, in accordance with disclosed implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods described herein may facilitate movement, separation, presentation, identification, picking, sortation, induction, singulation, and/or other material handling processes with respect to items having various shapes and sizes.

In example embodiments, an item separation system may comprise one or more conveyors that may move, separate, and/or present one or more items deposited thereon. For example, the item separation system may include three conveyors that at least partially overlap one another vertically. A third, third level, or highest level conveyor may move and/or separate one or more items toward a second, second level, or intermediate level conveyor. The second conveyor may move and/or separate one or more items toward a first, first level, or lowest level conveyor. The first conveyor may move, separate, and/or present one or more items at a picking area associated with the first conveyor. Vertical transfers, right angle transfers, or other types of transfers may facilitate movement of the one or more items between various conveyors, such as a vertical transfer between the third conveyor and the second conveyor, and a right angle transfer between the second conveyor and the first conveyor.

In addition, each of the one or more conveyors may move at various speeds, directions, durations, and/or patterns. In some example embodiments, the third conveyor may move at a slower speed than the second conveyor, and the second conveyor may also move at a slower speed than the first conveyor. Further, each of the one or more conveyors may change their respective movement directions, e.g., may move back and forth, and/or may move according to various patterns, which may include various combinations of different speeds, different directions, different durations, different patterns, or other aspects.

Based on various combinations of numbers of conveyors, positions of conveyors, orientations of conveyors, types of transfers between conveyors, and/or variations in movement speeds, directions, durations, and/or patterns of one or more conveyors, the item separation system may move, separate, and/or present items, e.g., at a picking area associated with a first conveyor, such that individual items may be identified, picked, moved, inducted, sorted, and/or singulated by one or more manual or automated systems and processes. The movement, separation, and/or presentation of one or more items may cause items that may be stacked or at least partially overlapping one another to move or separate from each other and present at least a portion of a respective surface of each of the items to facilitate identification and/or picking processes. In some example embodiments, the identification and/or picking processes may be performed by automated systems, such as a vision system, e.g., a three-dimensional, stereoscopic, structured light imaging system, and an item picking system, e.g., a six-axis robotic picking arm having an associated end effector.

In example embodiments, a vision system may capture imaging data of separated and/or presented items, e.g., at a picking area associated with a first conveyor. A control system may receive and process the imaging data to identify one or more items, e.g., to identify a pickable surface associated with an item, an area of a pickable surface associated with an item, a height of a pickable surface associated with an item, or other aspects of a pickable surface associated with an item. Based at least in part on the imaging data and identified pickable surfaces, the control system may instruct various operations of the item separation system and/or an item picking system.

In addition, as a result of movement, separation, and/or presentation of one or more items by the item separation system, the imaging data captured by the vision system and processed by the control system may include a relatively small number of items and/or items each having one or more identifiable pickable surfaces, such that the processing power or computational load on the vision system and control system may be reduced, as compared to capture and processing of imaging data including a relatively large number of items that have not been separated and/or presented as described herein. Further, the control system may process and identify pickable surfaces of items more quickly and efficiently based on imaging data including a relatively small number of items and/or items each having one or more identifiable pickable surfaces, as compared to capture and processing of imaging data including a relatively large number of items that have not been separated and/or presented as described herein.

For example, if various aspects of a pickable surface cannot be identified and/or do not meet threshold values, e.g., a pickable surface cannot be identified, an area of a pickable surface is too small for picking, and/or a height of a pickable surface is too high, the control system may instruct the item separation system to further move, separate, and/or present the one or more items. The instructions from the control system to the item separation system may comprise instructions related to various movement speeds, directions, durations, and/or patterns of one or more conveyors to cause further movement, separation, and/or presentation of one or more items.

In contrast, if various aspects of a pickable surface have been identified and/or meet threshold values, e.g., a pickable surface has been identified, an area of a pickable surface is large enough for picking, and/or a height of a pickable surface is acceptable, the control system may instruct the item picking system to pick, move, induct, sort, and/or singulate the item having the associated pickable surface. The instructions from the control system to the item picking system may comprise instructions related to movement of a robotic picking arm, actuation of one or more end effectors associated with the picking arm, picking of the item, movement of the item, and/or release of the item to cause movement, induction, sortation, and/or singulation of the item. Further, the item picking system may transfer the item to various downstream systems or processes, such as via a conveyor, chute, slide, bin, shelf, workstation, mobile or robotic drive unit, or combinations thereof.

The item separation system, the vision system, and the item picking system may move, separate, present, identify, pick, move, induct, sort, and/or singulate various types of items. For example, the items may comprise objects, packages, flat packages, boxes, containers, bags, pouches, products, pamphlets, cards, books, magazines, or various other types of items. In addition, the items may have various shapes, sizes, dimensions, surfaces, volumes, weights, or other characteristics.

FIG. 1 is a partial schematic diagram of an example item separation and picking system 100, in accordance with disclosed implementations.

The item separation and picking system 100 may include an item separation system comprising a frame 105, sidewalls 107, a third, third level, or highest level conveyor 110, a second, second level, or intermediate level conveyor 120, and a first, first level, or lowest level conveyor 130. The frame 105 may comprise various legs, feet, supports, bars, beams, rods, crossbars, platforms, surfaces, or other structural elements configured to couple to and support various portions of the item separation system. The frame 105 may be formed of various materials, such as aluminum, steel, other metals, plastics, composites, or combinations thereof, and portions of the frame 105 may couple together via various means, such a fasteners, welds, adhesives, or other joining elements. The sidewalls 107 may comprise various walls, guides, plates, surfaces, or other structural elements configured to couple to portions of the frame 105 and/or portions of the conveyors 110, 120, 130 to guide the movement, separation and/or presentation of items via the item separation system. The sidewalls 107 may be formed of various materials, such as aluminum, steel, other metals, plastics, composites, or combinations thereof, and the sidewalls 107 may couple to each other, portions of the frame 105, and/or portions of the conveyors 110, 120, 130 via various means, such a fasteners, welds, adhesives, or other joining elements.

In example embodiments, the frame 105 may couple to and support each of the third conveyor 110, second conveyor 120, and first conveyor 130. The third conveyor 110 may include one or more belts, rollers, or other movement elements configured to cause movement of items placed on the third conveyor 110. For example, the third conveyor 110 may include a third motor 112 configured to rotate one or more rollers that may in turn cause movement of one or more belts along the upper surface of the third conveyor 110.

The third conveyor 110 may be positioned at a third height that is greater than respective heights of the second conveyor 120 and first conveyor 130. In addition, the third conveyor 110 may move items at a third rate or speed that is generally slower than respective rates or speeds of movement of the second conveyor 120 and first conveyor 130. Further, the third conveyor 110 may also move items at different speeds, in different directions, for different durations, and/or according to different movement patterns.

In some example embodiments, the third conveyor 110 may also include a third sensor 114 configured to detect presence of one or more items on the third conveyor 110. For example, the third sensor 114 may comprise a photo eye, proximity sensor, or other type of presence detection sensor. Responsive to detecting one or more items on the third conveyor 110 by the third sensor 114, movement of the third conveyor 110 may be paused or stopped, and/or operation of one or more upstream systems or processes that provide items to the third conveyor 110 may also be paused or stopped.

The second conveyor 120 may also include one or more belts, rollers, or other movement elements configured to cause movement of items placed on the second conveyor 120. For example, the second conveyor 120 may include a second motor 122 configured to rotate one or more rollers that may in turn cause movement of one or more belts along the upper surface of the second conveyor 120.

The second conveyor 120 may be positioned at a second height that is lower than the third height of the third conveyor 110 and greater than a respective height of the first conveyor 130. In addition, the second conveyor 120 may move items at a second rate or speed that is generally faster than the third rate or speed of the third conveyor 110 and generally slower than a respective rate or speed of movement of the first conveyor 130. Further, the second conveyor 120 may also move items at different speeds, in different directions, for different durations, and/or according to different movement patterns.

In some example embodiments, the second conveyor 120 may also include a second sensor 124 configured to detect presence of one or more items on the second conveyor 120. For example, the second sensor 124 may comprise a photo eye, proximity sensor, or other type of presence detection sensor. Responsive to detecting one or more items on the second conveyor 120 by the second sensor 124, movement of the second conveyor 120 may be paused or stopped, movement of the third conveyor 110 may also be paused or stopped, and/or operation of one or more upstream systems or processes that provide items to the third conveyor 110 may also be paused or stopped.

The first conveyor 130 may also include one or more belts, rollers, or other movement elements configured to cause movement of items placed on the first conveyor 130. For example, the first conveyor 130 may include a first motor 132 configured to rotate one or more rollers that may in turn cause movement of one or more belts along the upper surface of the first conveyor 130.

The first conveyor 130 may be positioned at a first height that is lower than the third height of the third conveyor 110 and lower than the second height of the second conveyor 120. In addition, the first conveyor 130 may move items at a first rate or speed that is generally faster than the third rate or speed of the third conveyor 110 and generally faster than the second rate or speed of movement of the second conveyor 120. Further, the first conveyor 130 may also move items at different speeds, in different directions, for different durations, and/or according to different movement patterns.

In some example embodiments, the first conveyor 130 may also include a first sensor 134 configured to detect presence of one or more items on the first conveyor 130. For example, the first sensor 134 may comprise a photo eye, proximity sensor, or other type of presence detection sensor. Responsive to detecting one or more items on the first conveyor 130 by the first sensor 134, movement of the first conveyor 130 may be paused or stopped, movement of the second conveyor 120 may also be paused or stopped, movement of the third conveyor 110 may also be paused or stopped, and/or operation of one or more upstream systems or processes that provide items to the third conveyor 110 may also be paused or stopped.

As shown in FIG. 1, each of the conveyors 110, 120, 130 may at least partially overlap at least one other conveyor. For example, the third conveyor 110 may at least partially overlap the second conveyor 120, and the second conveyor 120 may at least partially overlap the first conveyor 130. By such partial overlap between conveyors 110, 120, 130, the item separation system may have a reduced or smaller footprint or required surface area within a material handling facility, thereby facilitating movement, separation, and/or presentation of items in a more efficient and compact form factor.

In addition, each of the conveyors 110, 120, 130 may have various positions or orientations with respect to at least one other conveyor. For example, the third conveyor 110 may move items in a substantially parallel direction with a direction of movement of items by the second conveyor 120, and the first conveyor 130 may move items in a substantially perpendicular direction with the direction of movement of items by the second conveyor 120. Further, each of the conveyors 110, 120, 130 may have various types of transfers with respect to at least one other conveyor. For example, the third conveyor 110 may move items via a vertical transfer, e.g., a vertical drop or waterfall, to the second conveyor 120, and the second conveyor 120 may move items via a right angle transfer, e.g., a change in direction of substantially 90 degrees, to the first conveyor 130.

Based on the differences in the rates or speeds of movement of the conveyors, e.g., the first conveyor 130 moves faster than the second conveyor 120, which also moves faster than the third conveyor 110, and also based on the various types of transfers between conveyors, e.g., a vertical transfer between the third conveyor 110 and the second conveyor 120 and a right angle transfer between the second conveyor 120 and the first conveyor 130, the item separation system may move, separate, and/or present items, such that the items presented at the picking area 138 may no longer be stacked, may be at least partially separated from each other, may lie flat on relatively larger surfaces of the items, and/or may present one or more pickable surfaces. For example, the increasing rates or speeds of the conveyors as items move from the third conveyor 110 down to the second conveyor 120 and further on to the first conveyor 110 may serve to separate items from one another. In addition, the vertical transfer may facilitate moving and separating items into a single file line of items, and the right angle transfer may further separate items that have been aligned in a single file line.

Although FIG. 1 shows a particular number, position, and orientation of conveyors, as well as a particular arrangement of vertical transfers or right angle transfers between conveyors, various other numbers, combinations, and/or arrangements of conveyors may be utilized to move, separate, and/or present items as described herein. In addition, various other numbers, types, combinations, and/or arrangements of sensors may be utilized to detect items as they are moved, separated, and/or presented as described herein. Other types of sensors may include imaging sensors, radiofrequency identification (RFID) readers, weight sensors, or various other types of sensors that may be integrated with or utilized together with the item separation system.

In some example embodiments, movements of the third conveyor 110, second conveyor 120, and first conveyor 130 may be coupled or cascaded. For example, all three conveyors 110, 120, 130 may initially move and separate items placed thereon as long as one or more items are not detected by the first sensor 134 on the first conveyor 130. Then, responsive to detecting one or more items on the first conveyor 130 by the first sensor 134, movement of the first conveyor 130 may be paused or stopped, and movements of the second conveyor 120 and the third conveyor 110 may continue as long as one or more items are not detected by the second sensor 124 on the second conveyor 120. Then, responsive to detecting one or more items on the second conveyor 120 by the second sensor 124, movement of the second conveyor 120 may also be paused or stopped, and movement of the third conveyor 110 may continue as long as one or more items are not detected by the third sensor 114 on the third conveyor 110. Then, responsive to detecting one or more items on the third conveyor 110 by the third sensor 114, movement of the third conveyor 110 may also be paused or stopped, and operation of one or more upstream systems or processes that provide items to the third conveyor 110 may also be paused or stopped. Thereafter, responsive to one or more items no longer being detected by the first sensor 134 on the first conveyor 130, all three conveyors 110, 120, 130 may again move and separate items placed thereon as long as one or more items are not detected by the first sensor 134 on the first conveyor 130, and the process described above may continue to repeat. By the above-described process, the item separation system may move, separate, and/or present items, e.g., at a picking area 138 associated with the first conveyor 130, while minimizing large or unnecessary gaps or empty distances or areas between items that have been moved, separated, and/or presented. In this manner, the item separation system may move, separate, and/or present items quickly and efficiently, while minimizing or reducing unnecessary delays or gaps in efficiency.

The item separation and picking system 100 may also include a vision system 150 configured to capture imaging data of the picking area 138 associated with the first conveyor 130. For example, the vision system 150 may comprise a three-dimensional, stereoscopic, structured light imaging device having a field of view that includes or encompasses all or substantially all of the picking area 138. The vision system 150 may also comprise various other types of imaging devices or sensors, such as a digital camera, a video camera, an RGB-D (red, green, blue, depth) camera, or other types imaging devices. In addition, the imaging data may comprise one or more still images, video imagery, analog imaging data, digital imaging data, color data, depth data, or other types of imaging data.

The vision system 150 may be configured to capture imaging data of the picking area 138 in various manners. For example, the vision system 150 may continuously capture imaging data of the picking area 138, may capture imaging data during operation of the item separation system, may capture imaging data responsive to detection of one or more items at the picking area 138 by the first sensor 134, may capture imaging data responsive to detection of one or more items by the second sensor 124 and/or the third sensor 114, may capture imaging data responsive to instructions or commands received from a control system 170, and/or combinations thereof.

Figure 6:
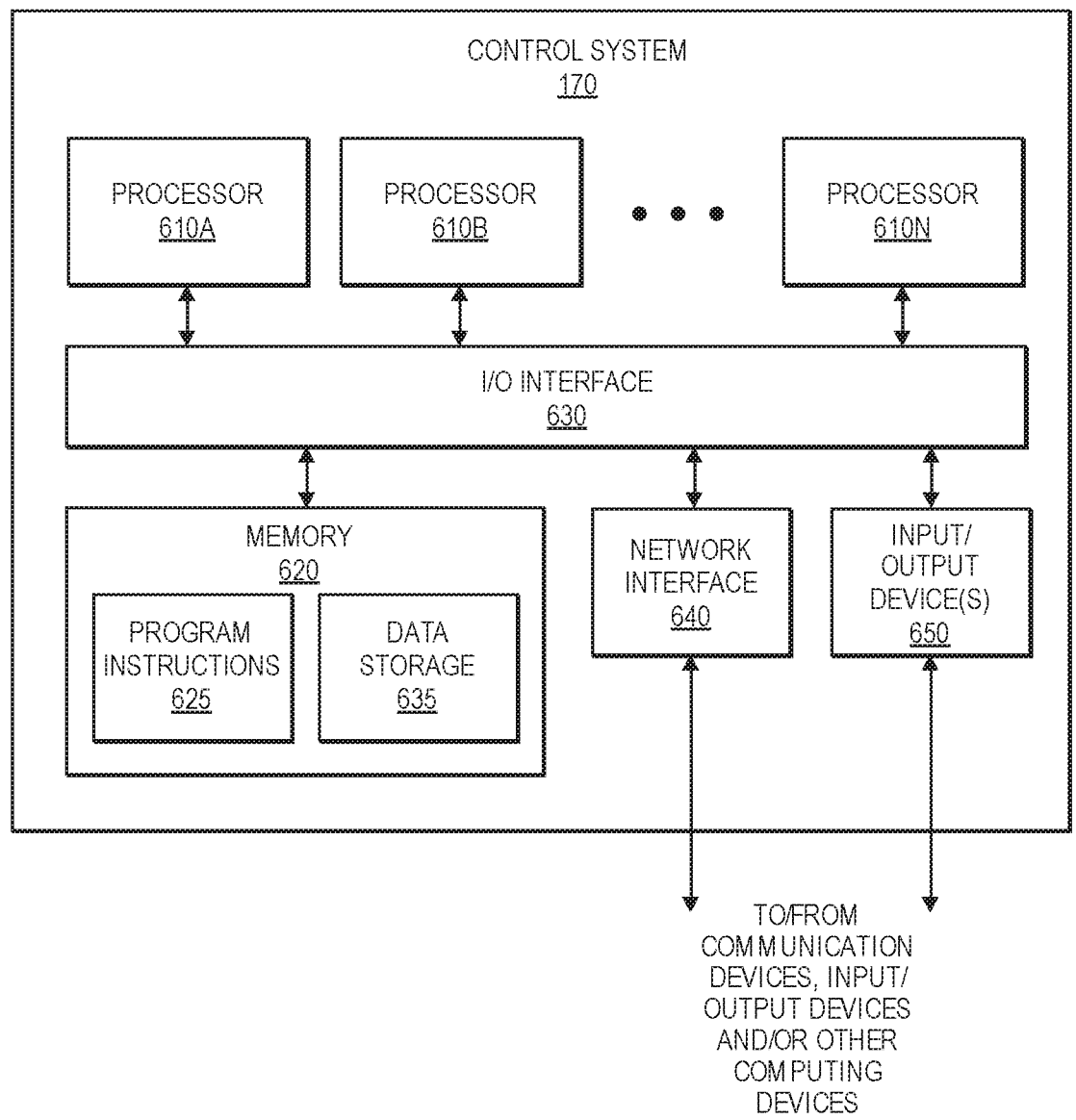
FIG. 6 is a block diagram illustrating an example control system, in accordance with disclosed implementations.

Each of the conveyors 110, 120, 130, the motors 112, 122, 132, the sensors 114, 124, 134, and/or the vision system 150 may be in communication with the control system 170, which is described in further detail herein with respect to FIG. 6. The control system 170 may receive data associated with movement of the conveyors 110, 120, 130 and the motors 112, 122, 132, data associated with detections of one or more items by the sensors 114, 124, 134, and/or imaging data captured by the vision system 150. For example, the control system 170 may process data received from the sensors 114, 124, 134 related to one or more detected items, and may instruct movement, pausing, stopping, or various other operations by the motors 112, 122, 132 and conveyors 110, 120, 130.

The control system 170 may process the imaging data captured by the vision system 150 to identify one or more items, to identify one or more pickable surfaces associated with the items, and/or to identify one or more aspects associated with the pickable surfaces. For example, the control system 170 may use various image processing techniques or algorithms, such as edge detection, surface detection, feature detection, object detection, or other types of image processing algorithms, to identify items, pickable surfaces, and/or aspects thereof. The aspects associated with pickable surfaces of items may comprise a position of a pickable surface within the imaging data and/or with respect to the picking area 138, an orientation of a pickable surface within the imaging data and/or with respect to the picking area 138, an area (or surface area) associated with a pickable surface, one or more dimensions of a pickable surface, a shape of a pickable surface, a texture or surface features of a pickable surface, a depth, distance, or height of a pickable surface relative to the vision system 150 and/or with respect to the picking area 138, and/or various other aspects associated with pickable surfaces.

In some example embodiments, if the control system 170 is not able to identify one or more items, pickable surfaces, and/or aspects thereof in order to pick and move an item from the picking area 138, the control system 170 may instruct the item separation system to cause further movement, separation, and/or presentation of one or more items.

For example, the control system 170 may instruct the first conveyor 130 and first motor 132 to further move and separate one or more items. The instructed movements may comprise changes in movement direction, speed, duration, and/or patterns of movement of the first conveyor 130, such as back and forth movements, sudden or jerky movements in one direction, slow or smooth movements in another direction, shorter movements in one direction, longer movements in another direction, and/or combinations of various changes in movement, which may comprise one or more defined patterns of movement.

In further example embodiments, the first conveyor 130 may also include one or more brushes or curtains 136 under and/or at least partially through which one or more items may be forced to pass. The brushes 136 may be formed of various materials, such as metals, plastics, fabrics, composites, other materials, or combinations thereof, and the brushes 136 may couple to each other, portions of the frame 105, and/or portions of the conveyors 110, 120, 130 via various means, such a fasteners, welds, adhesives, or other joining elements.

As part of the instructed movements from the control system 170 to cause further movement and separation of items, one or more items may be forced to pass under and/or at least partially through the brushes 136 one or more times, in order to cause the one or more items to no longer be stacked, be at least partially separated from each other, lie flat on relatively larger surfaces of the items, and/or present one or more pickable surfaces.

Although the control system 170 may instruct various changes in movement with respect to the first conveyor 130 as described here, in other example embodiments, the control system 170 may also instruct various changes in movement with respect to other conveyors of the item separation system, such as the second conveyor 120 and/or the third conveyor 110, to further cause movement, separation, and/or presentation of one or more items. Further, other conveyors of the item separation system may also include one or more brushes or curtains configured to cause one or more items to no longer be stacked, be at least partially separated from each other, lie flat on relatively larger surfaces of the items, and/or present one or more pickable surfaces.

Figure 2:
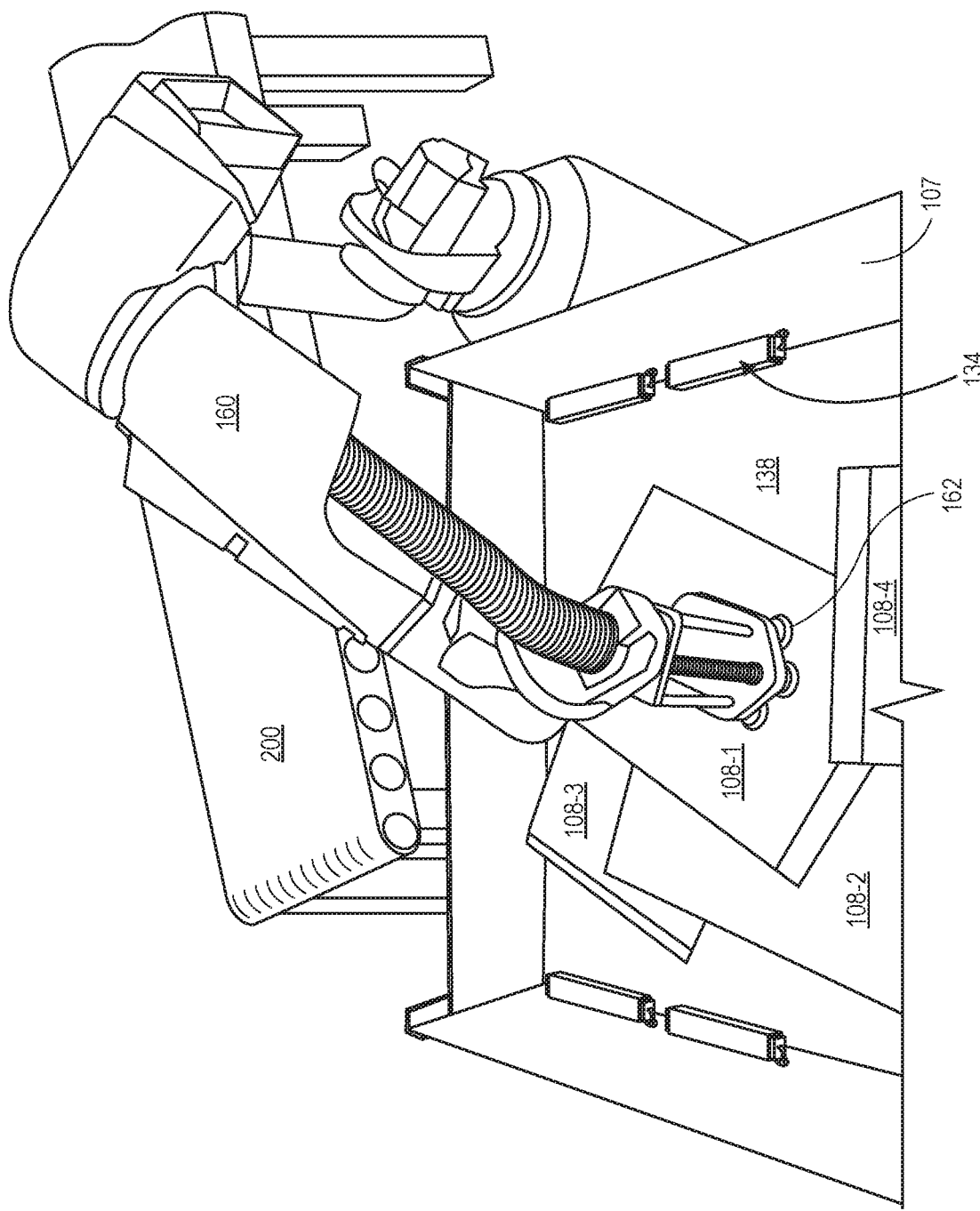
FIG. 2 is another partial schematic diagram of an example item separation and picking system, in accordance with disclosed implementations.

In some example embodiments, if the control system 170 is able to identify one or more items, pickable surfaces, and/or aspects thereof in order to pick and move an item from the picking area 138, the control system 170 may be in communication with and instruct an item picking system to pick and move an item, as further described herein with respect to FIG. 2.

FIG. 2 is another partial schematic diagram of an example item separation and picking system, in accordance with disclosed implementations.

The item picking system shown in FIG. 2 may comprise a six-axis, robotic picking arm 160 having one or more end effectors 162 configured to pick and move one or more items. In other example embodiments, the item picking system may comprise other types of robotic arms, picking apparatus, gantry systems, or other types of automated item picking systems. In addition, as shown in FIG. 2, the end effectors 162 may comprise suction or vacuum cups or tubes by which one or more items may be picked and moved using air suction or vacuum. In other example embodiments, the item picking system may comprise other types of end effectors, such as grasping elements, gripping elements, electroadhesive elements, (electro)magnetic elements, pneumatic actuators, hydraulic actuators, various other types of elements, actuators, and/or end effectors, and/or combinations thereof.

As shown in FIG. 2, four items 108-1, 108-2, 108-3, 108-4 are at least partially located within a picking area 138 associated with a first conveyor. In addition, a first sensor 134, which may comprise a plurality of similar or dissimilar sensors, may detect one or more of the items 108 within the picking area 138, and a control system 170 may instruct pausing or stopping of movement of the first conveyor.

In addition, a vision system (not shown in FIG. 2) may be placed over the picking area 138 and have a field of view that includes or encompasses all or substantially all of the picking area 138. As described herein, the control system 170 may receive data associated with movement of the conveyors 110, 120, 130 and the motors 112, 122, 132, data associated with detections of one or more items by the sensors 114, 124, 134, imaging data captured by the vision system 150, and/or data associated with movement and operations of the robotic picking arm 160.

The control system 170 may process the imaging data captured by the vision system 150 to identify one or more items 108, to identify one or more pickable surfaces associated with the items 108, and/or to identify one or more aspects associated with the pickable surfaces. For example, the control system 170 may use various image processing techniques or algorithms, such as edge detection, surface detection, feature detection, object detection, or other types of image processing algorithms, to identify items, pickable surfaces, and/or aspects thereof. The aspects associated with pickable surfaces of items may comprise a position of a pickable surface within the imaging data and/or with respect to the picking area 138, an orientation of a pickable surface within the imaging data and/or with respect to the picking area 138, an area (or surface area) associated with a pickable surface, one or more dimensions of a pickable surface, a shape of a pickable surface, a texture or surface features of a pickable surface, a depth, distance, or height of a pickable surface relative to the vision system 150 and/or with respect to the picking area 138, and/or various other aspects associated with pickable surfaces.

In some example embodiments, if the control system 170 is able to identify one or more items 108, pickable surfaces, and/or aspects thereof in order to pick and move an item from the picking area 138, the control system 170 may instruct the robotic picking arm 160 and associated end effector 162 to pick and move an item. For example, based at least in part on the position and orientation of a pickable surface associated with item 108-1, an area associated with the pickable surface of the item 108-1, a depth, distance, or height of the pickable surface of the item 108-1 relative to the vision system 150 and/or with respect to the picking area 138, and/or various other aspects associated with the pickable surface of the item 108-1, the control system 170 may instruct the robotic picking arm 160 to move and position itself close to the item 108-1 based on the position, orientation, and area of the pickable surface of the item 108-1, and move and actuate the end effector 162 to pick the item 108-1 based on the position, orientation, depth, and area of the pickable surface of the item 108-1.

Responsive to picking the item 108-1 from the picking area 138, the robotic picking arm 160 and associated end effector 162 may move the item 108-1 to a downstream system or process. For example, as shown in FIG. 2, the item 108-1 may be placed, inducted, sorted, and/or singulated via a downstream conveyor 200 that moves the item 108-1 to a further downstream system or process, which may include storage, sortation, packing, shipping, or various other processes. In other example embodiments, the item 108-1 may be placed, inducted, sorted, and/or singulated to various downstream systems or processes via various methods, such as other conveyors, chutes, slides, bins, shelves, workstations, mobile or robotic drive units, or combinations thereof. In some examples, the robotic picking arm 160 may be configured to move items to multiple downstream systems or processes, and the control system 170 may instruct the robotic picking arm 160 to place, induct, sort, and/or singulate items to one or more of such multiple downstream systems or processes, e.g., based on an identification of an item, a destination of an item, or other aspects.

Although FIG. 2 shows a single robotic picking arm 160 and associated end effector 162 configured to pick and move items, in other example embodiments, the item picking system may comprise a plurality of robotic picking arms or other automated picking apparatus to pick and move items, and each robotic picking arm or automated picking apparatus may comprise one or more end effectors, e.g., various combinations of suction or vacuum cups or tubes, grasping elements, gripping elements, electroadhesive elements, (electro)magnetic elements, pneumatic actuators, hydraulic actuators, or various other types of elements, actuators, and/or end effectors.

Further, in other example embodiments, the vision system 150 and the robotic picking arm 160 may be integrated or combined into an item picking system that may both identify one or more items, e.g., using a vision system, and also pick and move one or more items, e.g., using a robotic picking arm and associated end effector.

Figure 3:
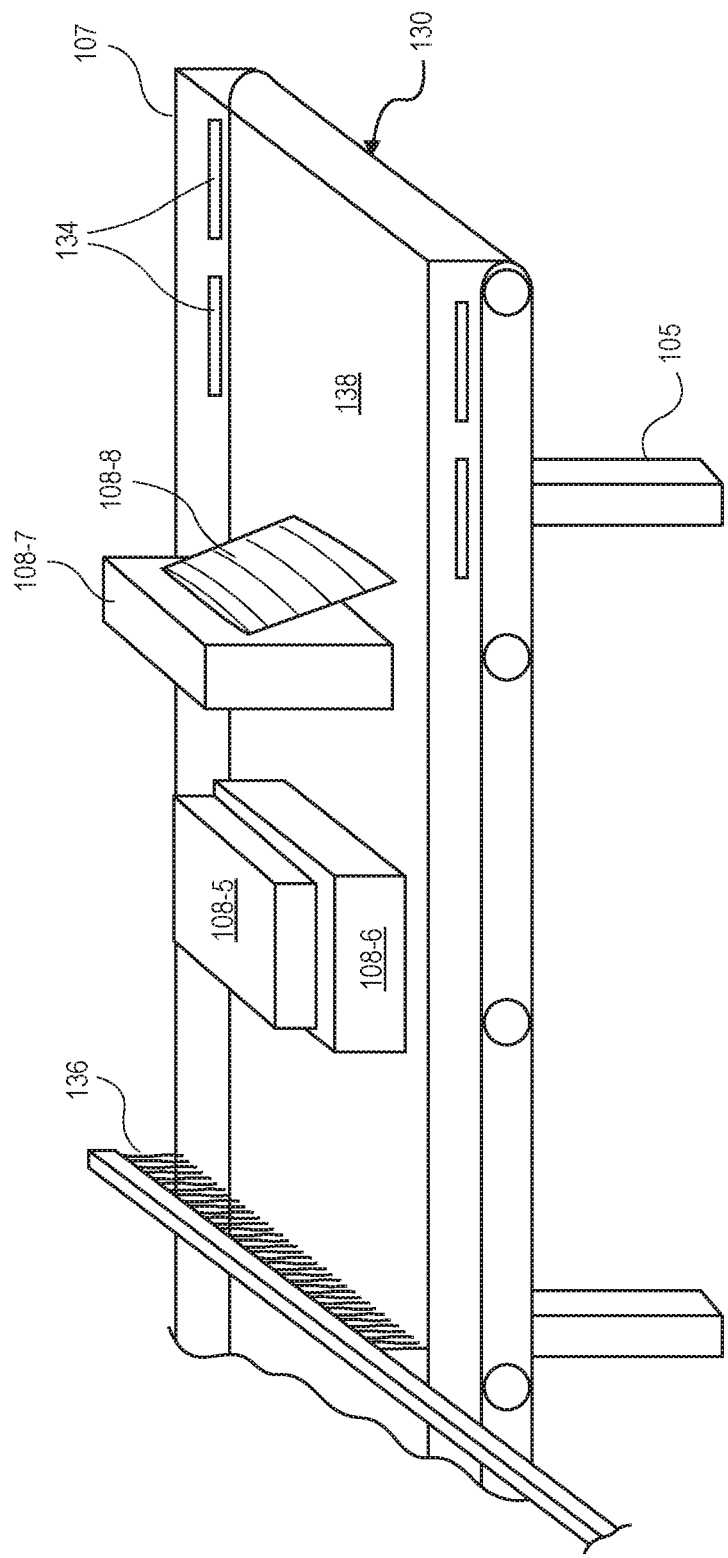
FIG. 3 is yet another partial schematic diagram of an example item separation and picking system, in accordance with disclosed implementations.

FIG. 3 is yet another partial schematic diagram of an example item separation and picking system, in accordance with disclosed implementations.

As shown in FIG. 3, the first conveyor 130 may include four items 108-5, 108-6, 108-7, 108-8 that are moving towards the picking area 138 associated with the first conveyor 130. In addition, a first sensor 134, which may comprise a plurality of similar or dissimilar sensors, may detect one or more of the items 108 as they enter the picking area 138, and a control system 170 may instruct pausing or stopping of movement of the first conveyor.

In addition, a vision system (not shown in FIG. 3) may be placed over the picking area 138 and have a field of view that includes or encompasses all or substantially all of the picking area 138. As described herein, the control system 170 may receive data associated with movement of the conveyors 110, 120, 130 and the motors 112, 122, 132, data associated with detections of one or more items by the sensors 114, 124, 134, imaging data captured by the vision system 150, and/or data associated with movement and operations of the robotic picking arm 160.

The control system 170 may process the imaging data captured by the vision system to identify one or more items 108, to identify one or more pickable surfaces associated with the items 108, and/or to identify one or more aspects associated with the pickable surfaces. For example, the control system 170 may use various image processing techniques or algorithms, such as edge detection, surface detection, feature detection, object detection, or other types of image processing algorithms, to identify items, pickable surfaces, and/or aspects thereof. The aspects associated with pickable surfaces of items may comprise a position of a pickable surface within the imaging data and/or with respect to the picking area 138, an orientation of a pickable surface within the imaging data and/or with respect to the picking area 138, an area (or surface area) associated with a pickable surface, one or more dimensions of a pickable surface, a shape of a pickable surface, a texture or surface features of a pickable surface, a depth, distance, or height of a pickable surface relative to the vision system and/or with respect to the picking area 138, and/or various other aspects associated with pickable surfaces.

In some example embodiments, as shown with various example items 108 in FIG. 3, the control system 170 may not able to identify one or more items, pickable surfaces, and/or aspects thereof in order to pick and move an item from the picking area 138. For example, items 108-5 and 108-6 may be stacked on top of one another. As a result, responsive to capturing and processing imaging data of items 108-5 and 108-6, a depth, distance, or height associated with a pickable surface, e.g., a large flat surface, of item 108-5 may not correspond to an expected height of the item 108-5, such that the control system 170 may instruct the item separation system to cause further movement, separation, and/or presentation of the item 108-5 from other items. In addition, responsive to capturing and processing imaging data of items 108-5 and 108-6, the item 108-6 may not be identifiable in the imaging data, a pickable surface, e.g., a large flat surface, of the item 108-6 may not be identifiable in the imaging data, and/or an area, shape, and/or dimensions of a pickable surface of the item 108-6 may not exceed minimum threshold values, such that the control system 170 may instruct the item separation system to cause further movement, separation, and/or presentation of the item 108-6 from other items.

In addition, item 108-7 may not be lying flat on a relatively large surface of the item. As a result, responsive to capturing and processing imaging data of item 108-7, the item 108-7 may not be identifiable in the imaging data, a pickable surface, e.g., a large flat surface, of the item 108-7 may not be identifiable in the imaging data, an area, shape, and/or dimensions of a pickable surface of the item 108-7 may not exceed minimum threshold values, and/or a depth, distance, or height associated with a pickable surface, e.g., a large flat surface, of item 108-7 may not correspond to an expected height of the item 108-7, such that the control system 170 may instruct the item separation system to cause further movement, separation, and/or presentation of the item 108-7 from other items.

Further, item 108-8 may be upright and leaning on another item, e.g., item 108-7. As a result, responsive to capturing and processing imaging data of item 108-8, the item 108-8 may not be identifiable in the imaging data, an orientation of a pickable surface of the item 108-8 may not be within an acceptable range, limits, or bounds, a pickable surface, e.g., a large flat surface, of the item 108-8 may not be identifiable in the imaging data, an area, shape, and/or dimensions of a pickable surface of the item 108-8 may not exceed minimum threshold values, and/or a depth, distance, or height associated with a pickable surface, e.g., a large flat surface, of item 108-8 may not correspond to an expected height of the item 108-8, such that the control system 170 may instruct the item separation system to cause further movement, separation, and/or presentation of the item 108-8 from other items.

For any of the example items 108 shown in FIG. 3 and described herein, the control system 170 may instruct the item separation system to cause further movement, separation, and/or presentation of one or more items. For example, the control system 170 may instruct the first conveyor 130 and first motor 132 to further move and separate one or more items. The instructed movements may comprise changes in movement direction, speed, duration, and/or patterns of movement of the first conveyor 130, such as back and forth movements, sudden or jerky movements in one direction, slow or smooth movements in another direction, shorter movements in one direction, longer movements in another direction, and/or combinations of various changes in movement, which may comprise one or more defined patterns of movement.

In further example embodiments, the first conveyor 130 may also include one or more brushes or curtains 136 under and/or at least partially through which one or more items may be forced to pass. The brushes 136 may be formed of various materials, such as metals, plastics, fabrics, composites, other materials, or combinations thereof, and the brushes 136 may couple to each other, portions of the frame 105, and/or portions of the conveyors 110, 120, 130 via various means, such a fasteners, welds, adhesives, or other joining elements.

As part of the instructed movements from the control system 170 to cause further movement and separation of items, one or more items may be forced to pass under and/or at least partially through the brushes 136 one or more times, in order to cause the one or more items to no longer be stacked, e.g., items 108-5, 108-6, be at least partially separated from each other, e.g., items 108-5, 108-6, 108-7, 108-8, lie flat on relatively larger surfaces of the items, e.g., items 108-5, 108-7, 108-8, and/or present one or more pickable surfaces, e.g., items 108-5, 108-6, 108-7, 108-8.

Various other numbers, types, positions, orientations, combinations, and/or arrangements of items other than those examples illustrated and described with respect to FIG. 3 may also potentially cause difficulties with identifying items, pickable surfaces, and/or aspects thereof, and the control system may accordingly instruct various changes to movements of one or more conveyors or portions of the item separation system to further cause separation and/or presentation of one or more items to facilitate picking and moving of the one or more items, and various other downstream systems or processes for the one or more items.

Figure 4:
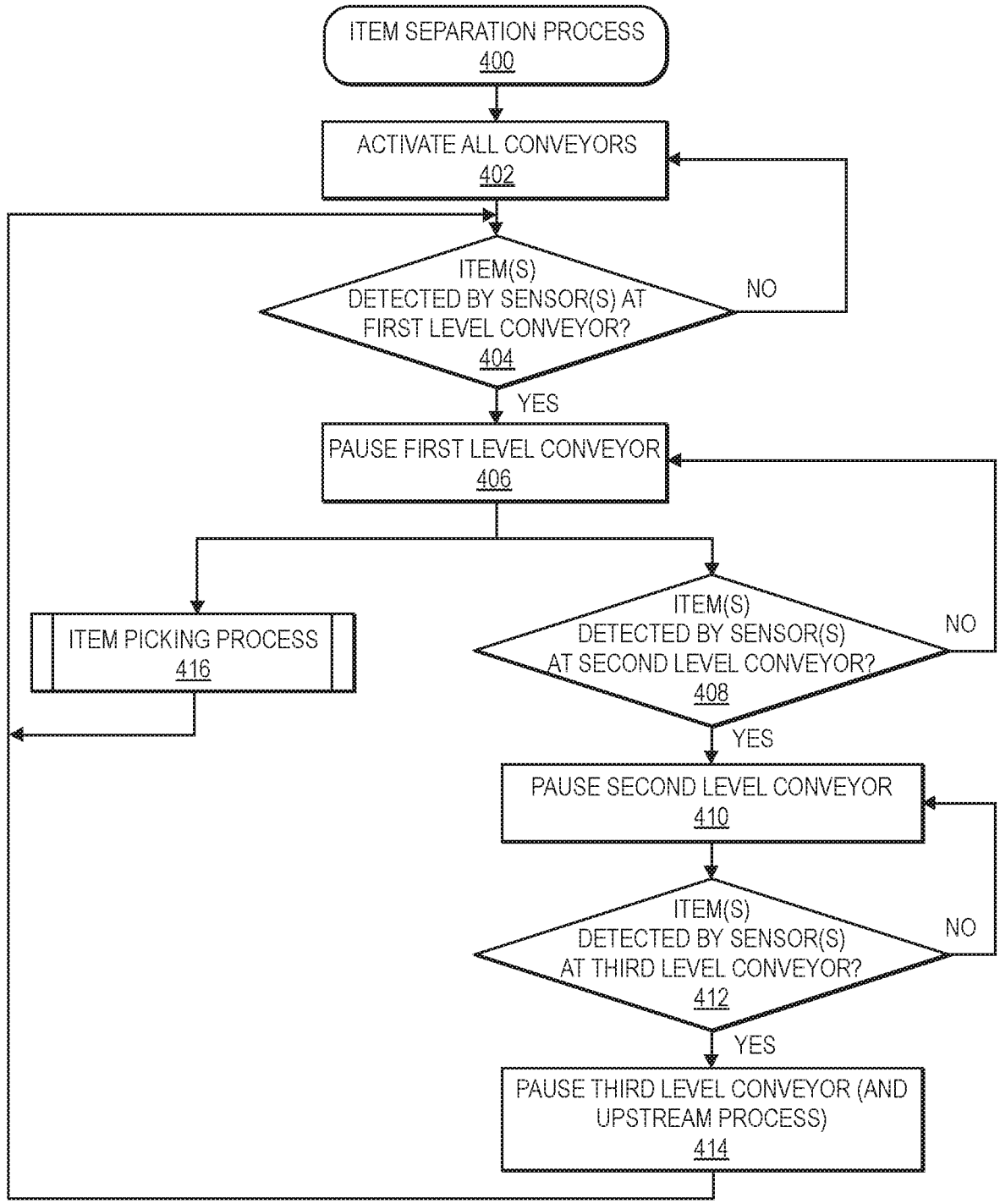
FIG. 4 is a flow diagram illustrating an example item separation process, in accordance with disclosed implementations.

FIG. 4 is a flow diagram illustrating an example item separation process 400, in accordance with disclosed implementations.

The process 400 may begin by activating all conveyors, as at 402. For example, an item separation system may include one or more conveyors, and a control system may activate or instruct operation of the one or more conveyors to move, separate, and/or present items placed thereon. The item separation system may receive the items from various upstream systems or processes. In example embodiments, the item separation system may include three conveyors at different respective heights, positions, and/or orientations, and the three conveyors may transfer items therebetween via various vertical transfers and/or right angle transfers. Further, the three conveyors may move items at different speeds, directions, durations, and/or patterns to move, separate, and/or present the items at a picking area associated with the item separation system.

The process 400 may continue by determining whether one or more items are detected by one or more sensors at a first level conveyor, as at 404. For example, one or more sensors may be associated with a first conveyor, e.g., a lowest level conveyor, and the sensors may detect the presence of one or more items at a picking area of the first conveyor. In some example embodiments, the one or more sensors may comprise photo eyes, proximity sensors, or other presence detection sensors. If one or more items are not detected by one or more sensors at a first level conveyor, then the process 400 may return to step 402 and continue to activate or instruct operation of all conveyors.

If, however, one or more items are detected by one or more sensors at a first level conveyor, then the process 400 may proceed by pausing the first level conveyor, as at 406. For example, responsive to detecting one or more items at a picking area of the first conveyor, e.g., a lowest level conveyor, a control system may instruct the first conveyor to pause or stop movement. In some example embodiments, a control system may instruct other conveyors of the item separation system to continue movement of items until one or more items are detected by one or more sensors associated with such other conveyors, as further described herein. In other example embodiments, a control system may instruct other conveyors of the item separation system to pause or stop movement concurrently with pausing or stopping movement of the first conveyor.

The process 400 may then continue to an item picking process, as at 416. The item picking process 416 is described herein in more detail with respect to FIG. 5. For example, the item picking process 416 may comprise identifying one or more items, pickable surfaces, and/or aspects thereof by a vision system and control system, instructing by a control system movement of portions of the item separation system responsive to not being able to identify one or more items, pickable surfaces, or aspects thereof, and/or instructing by a control system picking of one or more items by an item picking system responsive to being able to identify one or more items, pickable surfaces, or aspects thereof.

Substantially in parallel and/or concurrently with the item picking process 416, the process 400 may also proceed to determine whether one or more items are detected by one or more sensors at a second level conveyor, as at 408. For example, one or more sensors may be associated with a second conveyor, e.g., an intermediate level conveyor, and the sensors may detect the presence of one or more items at a detection area of the second conveyor. In some example embodiments, the one or more sensors may comprise photo eyes, proximity sensors, or other presence detection sensors. If one or more items are not detected by one or more sensors at a second level conveyor, then the process 400 may return to step 406 and continue to determine whether one or more items are detected by one or more sensors at a second level conveyor while the first level conveyor is paused and the item picking process 416 is continuing.

If, however, one or more items are detected by one or more sensors at a second level conveyor, then the process 400 may proceed by pausing the second level conveyor, as at 410. For example, responsive to detecting one or more items at a detection area of the second conveyor, e.g., an intermediate level conveyor, a control system may instruct the second conveyor to pause or stop movement. In some example embodiments, a control system may instruct other conveyors of the item separation system to continue movement of items until one or more items are detected by one or more sensors associated with such other conveyors, as further described herein. In other example embodiments, a control system may instruct other conveyors of the item separation system to pause or stop movement concurrently with pausing or stopping movement of the second conveyor.

Continuing substantially in parallel and/or concurrently with the item picking process 416, the process 400 may also proceed to determine whether one or more items are detected by one or more sensors at a third level conveyor, as at 412. For example, one or more sensors may be associated with a third conveyor, e.g., a highest level conveyor, and the sensors may detect the presence of one or more items at a detection area of the third conveyor. In some example embodiments, the one or more sensors may comprise photo eyes, proximity sensors, or other presence detection sensors. If one or more items are not detected by one or more sensors at a third level conveyor, then the process 400 may return to step 410 and continue to determine whether one or more items are detected by one or more sensors at a third level conveyor while the first and second level conveyors are paused and the item picking process 416 is continuing.

If, however, one or more items are detected by one or more sensors at a third level conveyor, then the process 400 may proceed by pausing the third level conveyor and/or various upstream systems or processes, as at 414. For example, responsive to detecting one or more items at a detection area of the third conveyor, e.g., a highest level conveyor, a control system may instruct the third conveyor to pause or stop movement. In some example embodiments, a control system may instruct other conveyors of the item separation system to continue movement of items until one or more items are detected by one or more sensors associated with such other conveyors, as further described herein. In other example embodiments, a control system may instruct other conveyors of the item separation system to pause or stop movement concurrently with pausing or stopping movement of the third conveyor.

Responsive to completing the item picking process 416 for one or more items, the process 400 may return to step 404 to determine whether one or more items are detected by one or more sensors at a first level conveyor, as at 404. If the sensors still detect the presence of one or more items at a picking area of the first conveyor, the process 400 may proceed to maintain pausing or stopping of the first level conveyor, as at 406, and continue with the item picking process 416 for one or more items that are still detected at the picking area of the first conveyor. Further, the process steps 408, 410, 412, 414 related to detecting items by sensors associated with other conveyors and pausing or stopping such other conveyors responsive to detecting items may continue to iterate and/or maintain such other conveyors paused or stopped substantially in parallel and/or concurrently with the item picking process 416.

Returning to step 404, if, however, the sensors do not detect the presence of one or more items at a picking area of the first conveyor, the process 400 may then return to step 402 and activate all conveyors. For example, because the sensors do not detect one or more items at the picking area, the control system may activate or instruct operation of all conveyors to move, separate, and/or present items at the picking area.

In some example embodiments, during pausing or stopping of the first level conveyor and during the item picking process, one or more sensors associated with other conveyors may detect one or more items in respective detection areas associated with such other conveyors. Responsive to such detection, the control system may instruct pausing or stopping of one or more of the other conveyors. Thus, the control system may instruct pausing or stopping of a plurality of conveyors in a coupled or cascaded manner based on data received from respective sensors, e.g., a first or lowest level conveyor may pause or stop first, a second or intermediate level conveyor may pause or stop next, and a third or highest level conveyor may pause or stop last.

In other example embodiments, one or more of the other conveyors may not include associated sensors to detect one or more items at respective detection areas of such other conveyors. In such examples, the control system may instruct pausing or stopping of one or more conveyors concurrently with one or more other conveyors that may include respective associated sensors to detect items in respective detection areas. For example, for an item separation system including three conveyors in which only the first and second level conveyors include respective associated sensors to detect items, during pausing or stopping of the first level conveyor and during the item picking process, one or more sensors associated with the second level conveyor may detect one or more items in a respective detection area associated with the second level conveyor. Responsive to such detection, the control system may instruct pausing or stopping of the second level conveyor, as well as pausing or stopping of the third level conveyor substantially concurrently therewith. Likewise, for an item separation system including three conveyors in which only the first level conveyor includes respective associated sensors to detect items, during pausing or stopping of the first level conveyor and during the item picking process, the control system may also instruct pausing or stopping of the second and third level conveyors substantially concurrently with pausing or stopping of the first level conveyor.

In further example embodiments, during pausing or stopping of the first level conveyor and during the item picking process, one or more sensors associated with other conveyors of the item separation system may not detect one or more items in respective detection areas. Thus, such other conveyors may continue operation without pausing or stopping throughout the item picking process. In addition, responsive to one or more sensors at the first level conveyor no longer detecting one or more items, such that the control system may then activate or instruct operation of all conveyors, such other conveyors may again continue operation without pausing or stopping.

Figure 5:
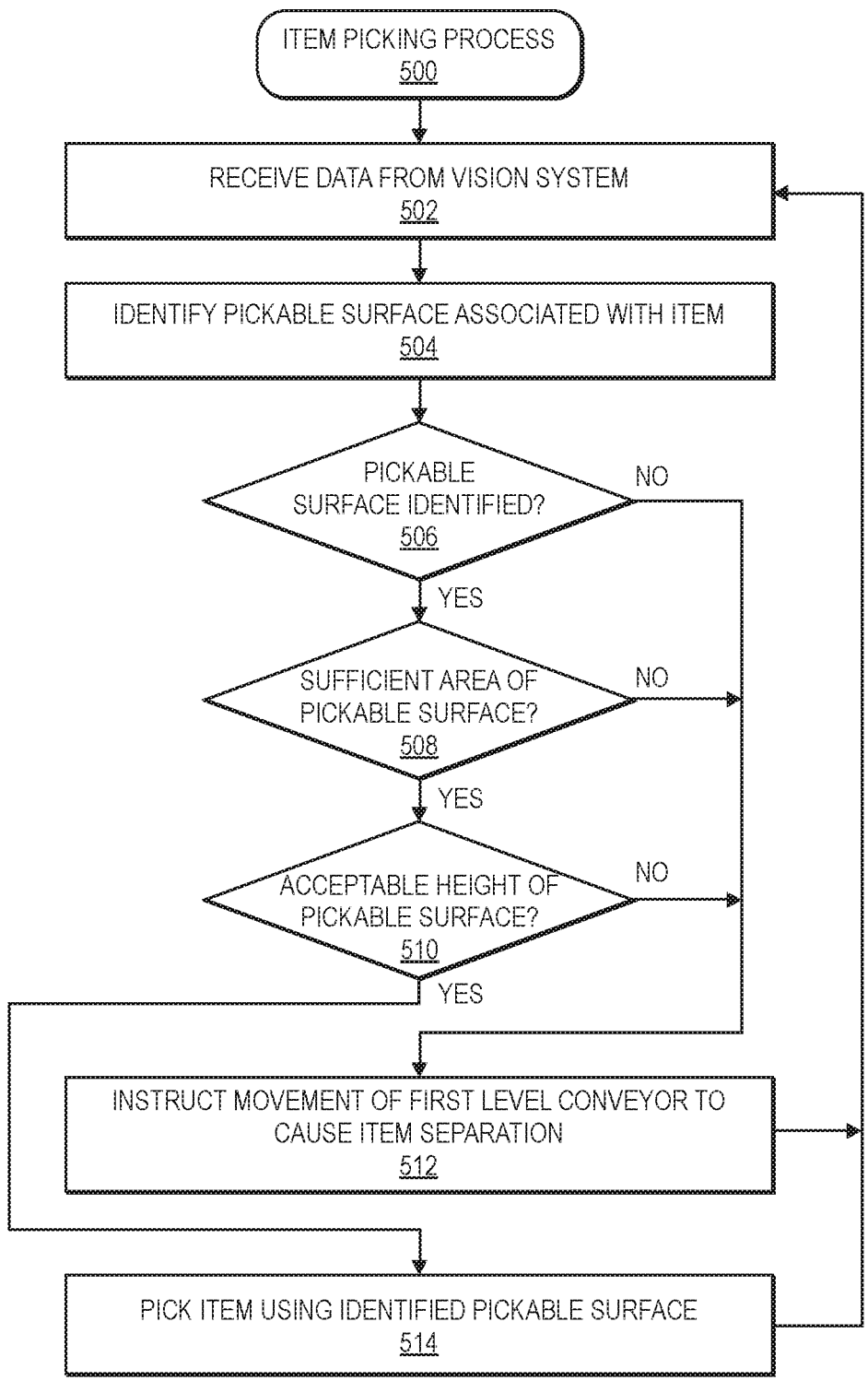
FIG. 5 is a flow diagram illustrating an example item picking process, in accordance with disclosed implementations.

FIG. 5 is a flow diagram illustrating an example item picking process 500, in accordance with disclosed implementations. The item picking process 416 described with respect to FIG. 4 may include any and all features described herein with respect to the example item picking process 500.

The process 500 may begin by receiving data from a vision system, as at 502. For example, a control system may receive imaging data from the vision system. In example embodiments, the vision system may comprise a three-dimensional, stereoscopic, structured light imaging device having a field of view that includes or encompasses all or substantially all of a picking area associated with an item separation system. In other example embodiments, the vision system may comprise a digital camera, a video camera, an RGB-D (red, green, blue, depth) camera, or other types imaging sensors or devices. In addition, the data may comprise imaging data, including one or more still images, video imagery, analog imaging data, digital imaging data, color data, depth data, or other types of imaging data.

The process 500 may continue with identifying a pickable surface associated with an item, as at 504. For example, the control system may process the imaging data using various image processing techniques or algorithms, such as edge detection, surface detection, feature detection, object detection, or other types of image processing algorithms, to identify items, pickable surfaces, and/or aspects thereof. The aspects associated with pickable surfaces of items may comprise a position of a pickable surface within the imaging data and/or with respect to the picking area, an orientation of a pickable surface within the imaging data and/or with respect to the picking area, an area (or surface area) associated with a pickable surface, one or more dimensions of a pickable surface, a shape of a pickable surface, a texture or surface features of a pickable surface, a depth, distance, or height of a pickable surface relative to the vision system and/or with respect to the picking area, and/or various other aspects associated with pickable surfaces.

In some example embodiments, the control system may identify an item using various methods, such as image processing and identification, optical character recognition, barcode or identifier scanning and matching, radiofrequency identifier (RFID) tag reading and identification, or various other methods. In addition, the control system may identify pickable surfaces and/or aspects thereof using various methods, such as image processing and identification, edge detection, surface detection, feature detection, depth, distance, or height determination or calculation, or various other methods.

The process 500 may then continue to determine whether a pickable surface of the item has been identified, as at 506, whether a sufficient area of the pickable surface is available, as at 508, and/or whether an acceptable height of the pickable surface is determined, as at 510. For example, a pickable surface may comprise one or more flat surfaces (or grippable/graspable surfaces, magnetic surfaces, smooth surfaces, etc.) associated with an item and within a field of view of the vision system having various aspects or attributes, such as a minimum or threshold area, one or more minimum or threshold dimensions, a desired or acceptable position or orientation with respect to the item, a desired or acceptable shape, a desired or acceptable surface texture, a minimum, maximum, or expected depth, distance, or height, and/or various other aspects or attributes.

In some example embodiments, various minimum, maximum, threshold, and/or acceptable aspects or attributes of a pickable surface may be dependent upon capabilities of an item picking system, e.g., a robotic picking arm and associated end effector. For example, a desired or acceptable position, orientation, or height of a pickable surface of an item may be dependent upon position and orientation limits and/or ranges of the robotic picking arm and associated end effector. In addition, minimum or threshold areas, dimensions, and/or shapes of a pickable surface of an item may be dependent upon shape, size, dimensions, or other aspects associated with the robotic picking arm and associated end effector. Further, desired or acceptable surface textures or features may be dependent upon a type of an end effector, e.g., suction or vacuum cups, grasping elements, (electro) magnetic elements, or other types of end effectors.

In other example embodiments, based on the identified item, pickable surface, and/or aspects thereof, a control system may select a configuration of an item picking system to pick and move the item using the identified pickable surface. For example, if multiple robotic picking arms, automated picking apparatus, or other picking systems are available, the control system may select an automated picking apparatus with appropriate range of motion to pick and move an item having a pickable surface at a particular position, orientation, or height. In addition, if multiple end effectors are available with one or more robotic picking arms, automated picking apparatus, or other picking systems, the control system may select an end effector of a type appropriate to pick and move the item having the pickable surface with a particular size, dimensions, shape, surface features, or other aspects.

If an item, one or more pickable surfaces, and/or aspects thereof cannot be identified or determined with respect to minimum, maximum, threshold, desired, or acceptable values, ranges, or limits, as at steps 506, 508, 510, the process 500 may proceed to instruct movement of the first level conveyor to cause item separation, as at 512. For example, the control system may instruct various changes to movement of the first conveyor, e.g., a lowest level conveyor having an associated picking area, to further move and separate one or more items. The instructed movements may comprise changes in movement direction, speed, duration, and/or patterns of movement of the first conveyor, such as back and forth movements, sudden or jerky movements in one direction, slow or smooth movements in another direction, shorter movements in one direction, longer movements in another direction, and/or combinations of various changes in movement, which may comprise one or more defined patterns of movement. In addition, the control system may also instruct various changes to movement of the first conveyor to cause one or more items to pass under and/or at least partially through one or more brushes or curtains associated with the first conveyor one or more times, in order to cause the one or more items to no longer be stacked, be at least partially separated from each other, lie flat on relatively larger surfaces of the items, and/or present one or more pickable surfaces. In other example embodiments, the control system may also instruct various changes in movement, as described herein, to other conveyors of the item separation system.

If, however, an item, one or more pickable surfaces, and/or aspects thereof have been identified or determined with respect to minimum, maximum, threshold, desired, or acceptable values, ranges, or limits, as at steps 506, 508, 510, the process 500 may proceed to instruct picking of the item using the identified pickable surface, as at 514. For example, the control system may instruct an item picking system to pick and move the item, based at least in part on position, orientation, and/or height data associated with the pickable surface of the item, and using an end effector appropriate for various identified aspects of the pickable surface. In some example embodiments, the item picking system may comprise a robotic picking arm having a suction end effector, and the control system may instruct the robotic picking arm to position the end effector to pick the item based on position, orientation, and/or height data associated with the pickable surface of the item, and may instruct the suction end effector to pick up or grasp the pickable surface of the item, which may meet or satisfy minimum or acceptable values, thresholds, ranges, or limits with respect to area, dimensions, shape, and/or surface texture of the pickable surface.

Following steps 512 or 514, the process 500 may then return to step 502 and receive data from the vision system, so that the control system may again attempt to identify an item, one or more pickable surfaces, and/or aspects thereof for picking and movement of one or more items using an item picking system to various downstream systems or processes, which may include storage, sortation, packing, shipping, or various other processes. In addition, one or more items may be placed, inducted, sorted, and/or singulated to various downstream systems or processes via various methods, such as other conveyors, chutes, slides, bins, shelves, workstations, mobile or robotic drive units, or combinations thereof.

Although the control system has been generally described herein as separate and in communication with the item separation system, the vision system, the item picking system, and various other portions of the systems and methods described herein, in other example embodiments, the control system or portions thereof may be combined or integrated with one or more other portions, components, or elements of the systems. For example, the control system may be integrated with the vision system, image processing techniques or algorithms may be integrated with the vision system, the control system may be integrated with the item separation system, the control system may be integrated with the item picking system, or the control system may be integrated with the item separation system and the item picking system. Various other combinations or integrations of at least a portion of the control system with one or more other portions, components, or elements of the systems and methods described herein may also be used to facilitate movement, separation, presentation, identification, picking, movement, induction, sortation, and/or singulation of one or more items.

FIG. 6 is a block diagram illustrating an example control system 170, in accordance with disclosed implementations.

Various operations of a control system, such as those described herein, may be executed on one or more computer systems, and/or interacting with various other computers, systems, or devices in a material handling facility, according to various implementations. For example, the control system discussed above may function and operate on one or more computer systems. One such control system is illustrated by the block diagram in FIG. 6. In the illustrated implementation, a control system 170 includes one or more processors 610A, 610B through 610N, coupled to a non-transitory computer-readable storage medium 620 via an input/output (I/O) interface 630. The control system 170 further includes a network interface 640 coupled to the I/O interface 630, and one or more input/output devices 650. In some implementations, it is contemplated that a described implementation may be implemented using a single instance of the control system 170 while, in other implementations, multiple such systems or multiple nodes making up the control system 170 may be configured to host different portions or instances of the described implementations. For example, in one implementation, some data sources or services (e.g., related to item movement, separation, presentation, imaging, identification, picking, moving, placing, sorting, singulating, etc.) may be implemented via one or more nodes of the control system 170 that are distinct from those nodes implementing other data sources or services.

In various implementations, the control system 170 may be a uniprocessor system including one processor 610A, or a multiprocessor system including several processors 610A-610N (e.g., two, four, eight, or another suitable number). The processors 610A-610N may be any suitable processor capable of executing instructions. For example, in various implementations, the processors 610A-610N may be general-purpose or embedded processors implementing any of a variety of instruction set architectures (ISAs), such as the x86, PowerPC, SPARC, or MIPS ISAs, or any other suitable ISA. In multiprocessor systems, each of the processors 610A-610N may commonly, but not necessarily, implement the same ISA.

The non-transitory computer-readable storage medium 620 may be configured to store executable instructions and/or data accessible by the one or more processors 610A-610N. In various implementations, the non-transitory computer-readable storage medium 620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 620 as program instructions 625 and data storage 635, respectively. In other implementations, program instructions and/or data may be received, sent or stored upon different types of computer-accessible media, such as non-transitory media, or on similar media separate from the non-transitory computer-readable storage medium 620 or the control system 170. Generally speaking, a non-transitory, computer-readable storage medium may include storage media or memory media such as magnetic or optical media, e.g., disk or CD/DVD-ROM, coupled to the control system 170 via the I/O interface 630. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 640.

In one implementation, the I/O interface 630 may be configured to coordinate I/O traffic between the processors 610A-610N, the non-transitory computer-readable storage medium 620, and any peripheral devices, including the network interface 640 or other peripheral interfaces, such as input/output devices 650. In some implementations, the I/O interface 630 may perform any necessary protocol, timing or other data transformations to convert data signals from one component (e.g., non-transitory computer-readable storage medium 620) into a format suitable for use by another component (e.g., processors 610A-610N). In some implementations, the I/O interface 630 may include support for devices attached through various types of peripheral buses, such as a variant of the Peripheral Component Interconnect (PCI) bus standard or the Universal Serial Bus (USB) standard, for example. In some implementations, the function of the I/O interface 630 may be split into two or more separate components, such as a north bridge and a south bridge, for example. Also, in some implementations, some or all of the functionality of the I/O interface 630, such as an interface to the non-transitory computer-readable storage medium 620, may be incorporated directly into the processors 610A-610N.

The network interface 640 may be configured to allow data to be exchanged between the control system 170 and other devices attached to a network, such as other control systems, computer systems, item separation systems, vision systems, item picking systems, robotic systems, robotic or mobile drive units and systems, other material handling systems or equipment, or between nodes of the control system 170. In various implementations, the network interface 640 may support communication via wired or wireless general data networks, such as any suitable type of Ethernet network.

Input/output devices 650 may, in some implementations, include one or more displays, projection devices, audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 170. Multiple input/output devices 650 may be present in the control system 170 or may be distributed on various nodes of the control system 170. In some implementations, similar input/output devices may be separate from the control system 170 and may interact with one or more nodes of the control system 170 through a wired or wireless connection, such as over the network interface 640.

As shown in FIG. 6, the memory 620 may include program instructions 625 that may be configured to implement one or more of the described implementations and/or provide data storage 635, which may comprise various tables, data stores and/or other data structures accessible by the program instructions 625. The program instructions 625 may include various executable instructions, programs, or applications to facilitate item movement, separation, presentation, imaging, identification, picking, moving, placing, sorting, singulating, or other processes, such as motor controllers, drivers, or applications, sensor controllers, drivers, or applications, sensor data processing applications, imaging data processing applications, robotic apparatus controllers, drivers, or applications, automated picking apparatus controllers, drivers, or applications, end effector controllers, drivers, or applications, etc. The data storage 635 may include various data stores for maintaining data related to item separation systems, motors, sensors, movement speeds, directions, durations, and/or patterns, sensor data, items, pickable surfaces of items, aspects associated with pickable surfaces of items, imaging data, item picking systems, robotic picking arms, automated picking apparatus, end effectors, upstream systems or processes, downstream systems or processes, etc.

Those skilled in the art will appreciate that the control system 170 is merely illustrative and is not intended to limit the scope of implementations. In particular, the control system and devices may include any combination of hardware or software that can perform the indicated functions, including computers, network devices, internet appliances, robotic devices, etc. The control system 170 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will appreciate that, in some implementations, the functionality provided by the methods, systems, and apparatus discussed above may be provided in alternative ways, such as being split among more software modules or routines or consolidated into fewer modules or routines, and/or being split into additional or fewer robotic or automated units. Similarly, in some implementations, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. The various methods, apparatus, and systems as illustrated in the figures and described herein represent example implementations. The methods and systems may be implemented in software, hardware, or a combination thereof in other implementations. Similarly, the order of any method may be changed and various features may be added, reordered, combined, omitted, modified, etc., in other implementations.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solidstate memory, flash drive, removable disk and/or other media. In addition, components of one or more of the modules and nodes may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and/or within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a non-transitory computer-readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An apparatus, comprising:
    an item separation system, comprising:
        a first conveyor positioned at a first height and including a picking area;
        a second conveyor positioned at a second height greater than the first height; and
        a third conveyor positioned at a third height greater than the second height;
        wherein a first direction of travel of the first conveyor is angled 90 degrees relative to a second direction of travel of the second conveyor; and
        wherein the second direction of travel of the second conveyor is parallel to a third direction of travel of the third conveyor;
    a first sensor configured to detect items present on the first conveyor;
    a three-dimensional vision system configured to capture imaging data of the picking area;
    a robotic picking arm and associated end effector configured to pick items from the picking area; and
    a control system in communication with the item separation system, the three-dimensional vision system, and the robotic picking arm, the control system configured to:
        instruct movement of at least one of the first conveyor, the second conveyor, or the third conveyor of the item separation system based at least in part on the imaging data captured by the three-dimensional vision system;
        pause movement of the first conveyor responsive to detection of items by the first sensor; and
        instruct picking of an item by the robotic picking arm and associated end effector based at least in part on the imaging data captured by the three-dimensional vision system.

2. The apparatus of claim 1, wherein:
the first conveyor is configured to move at a first rate;
the second conveyor is configured to move at a second rate slower than the first rate; and
the third conveyor is configured to move at a third rate slower than the second rate.

3. The apparatus of claim 1, wherein:
the second conveyor at least partially overlaps the first conveyor and forms a right angle transfer therebetween; and
the third conveyor at least partially overlaps the second conveyor and forms a vertical transfer therebetween.

4. The apparatus of claim 3, wherein:
the first conveyor is configured to receive items from the second conveyor via the right angle transfer;
the second conveyor is configured to receive items from the third conveyor via the vertical transfer; and
the third conveyor is configured to receive items from an upstream system.

5. The apparatus of claim 1, further comprising:
a second sensor configured to detect items present on the second conveyor; and
a third sensor configured to detect items present on the third conveyor;
wherein the control system is further configured to:
    pause movement of the second conveyor responsive to detection of items by the first sensor and detection of items by the second sensor; and
    pause movement of the third conveyor responsive to detection of items by the first sensor, detection of items by the second sensor, and detection of items by the third sensor.

6. An apparatus, comprising:
an item separation system configured to separate and present items at a picking area, the item separation system including at least one brush configured to engage and separate items;
a vision system configured to capture imaging data of the picking area;
an item picking system configured to pick items from the picking area; and
a control system in communication with the item separation system, the vision system, and the item picking system, the control system configured to instruct operations of the item separation system based at least in part on the imaging data captured by the vision system.

7. The apparatus of claim 6, wherein the item separation system comprises a plurality of conveyors configured to move and separate items to be presented at the picking area.

8. The apparatus of claim 7, wherein the control system is further configured to instruct respective movements of the plurality of conveyors to separate items by adjusting at least one of a speed, a direction, a duration, or a pattern of respective movements.

9. The apparatus of claim 7, wherein the plurality of conveyors transfer items therebetween by at least one of a vertical transfer or a right angle transfer.

10. The apparatus of claim 7, wherein at least one conveyor of the plurality of conveyors includes the at least one brush configured to engage and separate items.

11. An apparatus, comprising:
an item separation system configured to separate and present items at a picking area;
at least one sensor configured to detect items present on the item separation system;
a vision system configured to capture imaging data of the picking area;
an item picking system configured to pick items from the picking area; and
a control system in communication with the item separation system, the vision system, and the item picking system, the control system configured to instruct operations of the item separation system based at least in part on the imaging data captured by the vision system.

12. The apparatus of claim 11, wherein the control system is further configured to pause movement of at least a portion of the item separation system based at least in part on detection of items at the picking area by the at least one sensor.

13. An apparatus, comprising:
an item separation system configured to separate and present items at a picking area;
a vision system configured to capture imaging data of the picking area;
an item picking system configured to pick items from the picking area; and
a control system in communication with the item separation system, the vision system, and the item picking system, the control system configured to instruct operations of the item separation system based at least in part on the imaging data captured by the vision system;
wherein the control system is further configured to identify at least one of a pickable surface of an item, an area of a pickable surface of an item, or a height of a pickable surface of an item based at least in part on the imaging data captured by the vision system.

14. The apparatus of claim 13, wherein the control system is further configured to instruct movement, by adjusting at least one of a speed, a direction, a duration, or a pattern of movement, of at least a portion of the item separation system based at least in part on the at least one of the pickable surface of the item, the area of the pickable surface of the item, or the height of the pickable surface of the item.

15. The apparatus of claim 13, wherein the control system is further configured to:
instruct operations of the item picking system based at least in part on the imaging data captured by the vision system; and
instruct picking, by the item picking system, of the item based at least in part on the at least one of the pickable surface of the item, the area of the pickable surface of the item, or the height of the pickable surface of the item.

16. An apparatus, comprising:
an item separation system configured to separate and present items at a picking area;
a vision system configured to capture imaging data of the picking area;
an item picking system configured to pick items from the picking area;
a control system in communication with the item separation system, the vision system, and the item picking system, the control system configured to instruct operations of the item separation system based at least in part on the imaging data captured by the vision system; and
a downstream system configured to receive items picked by the item picking system from the picking area;
wherein the downstream system comprises at least one of a conveyor, a chute, a slide, a bin, a shelf, a workstation, or a mobile drive unit.

17. A method, comprising:
separating and presenting at a picking area, via an item separation system, an item from a plurality of items;
capturing, via a vision system, imaging data of the item at the picking area;
identifying, via a control system, a pickable surface associated with the item at the picking area; and
instructing, via the control system, movement of the item separation system based at least in part on the pickable surface associated with the item;
wherein identifying the pickable surface associated with the item at the picking area further comprises determining at least one of an area or a height associated with the pickable surface of the item.

18. The method of claim 17, wherein instructing movement of the item separation system based at least in part on the pickable surface associated with the item further comprises adjusting at least one of a speed, a direction, a duration, or a pattern of movement of at least a portion of the item separation system.

19. A method, comprising:
separating and presenting at a picking area, via an item separation system, an item from a plurality of items;
detecting, via at least one sensor, the item at the picking area;
instructing, via a control system, at least a portion of the item separation system to pause movement based at least in part on the item detected at the picking area
capturing, via a vision system, imaging data of the item at the picking area;
identifying, via the control system, a pickable surface associated with item at the picking area; and
instructing, via the control system, movement of the item separation system based at least in part on the pickable surface associated with the item.

* * * * *